Oct. 3, 1961 N. F. MARZOLF 3,002,619
EGG GRADER
Filed Dec. 20, 1955 3 Sheets-Sheet 1
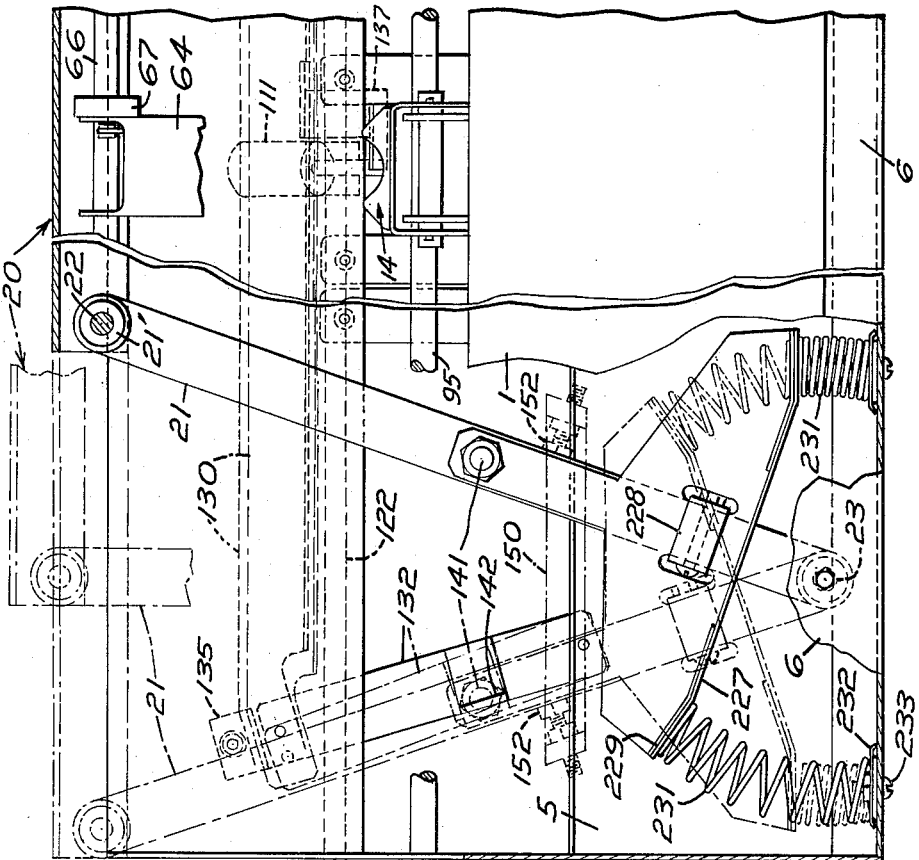
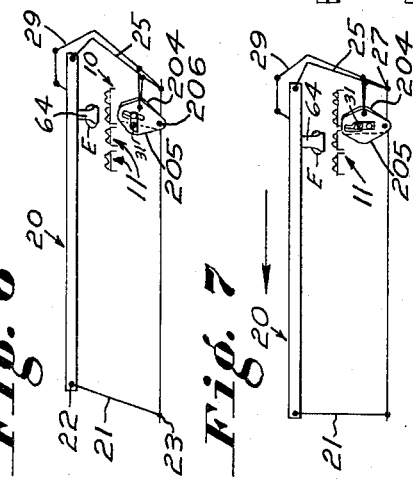
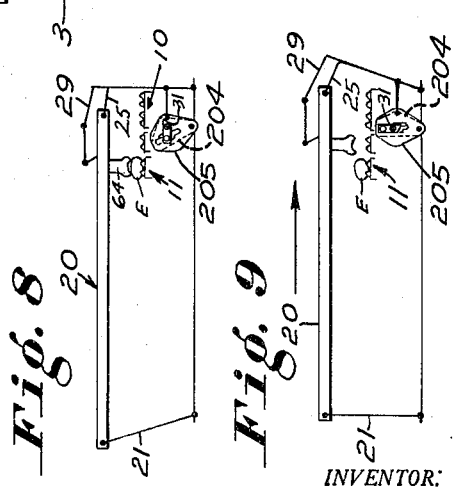
INVENTOR:
NORBERT F. MARZOLF
BY
Beau, Brooks, Buckley & Beau,
ATTORNEYS.

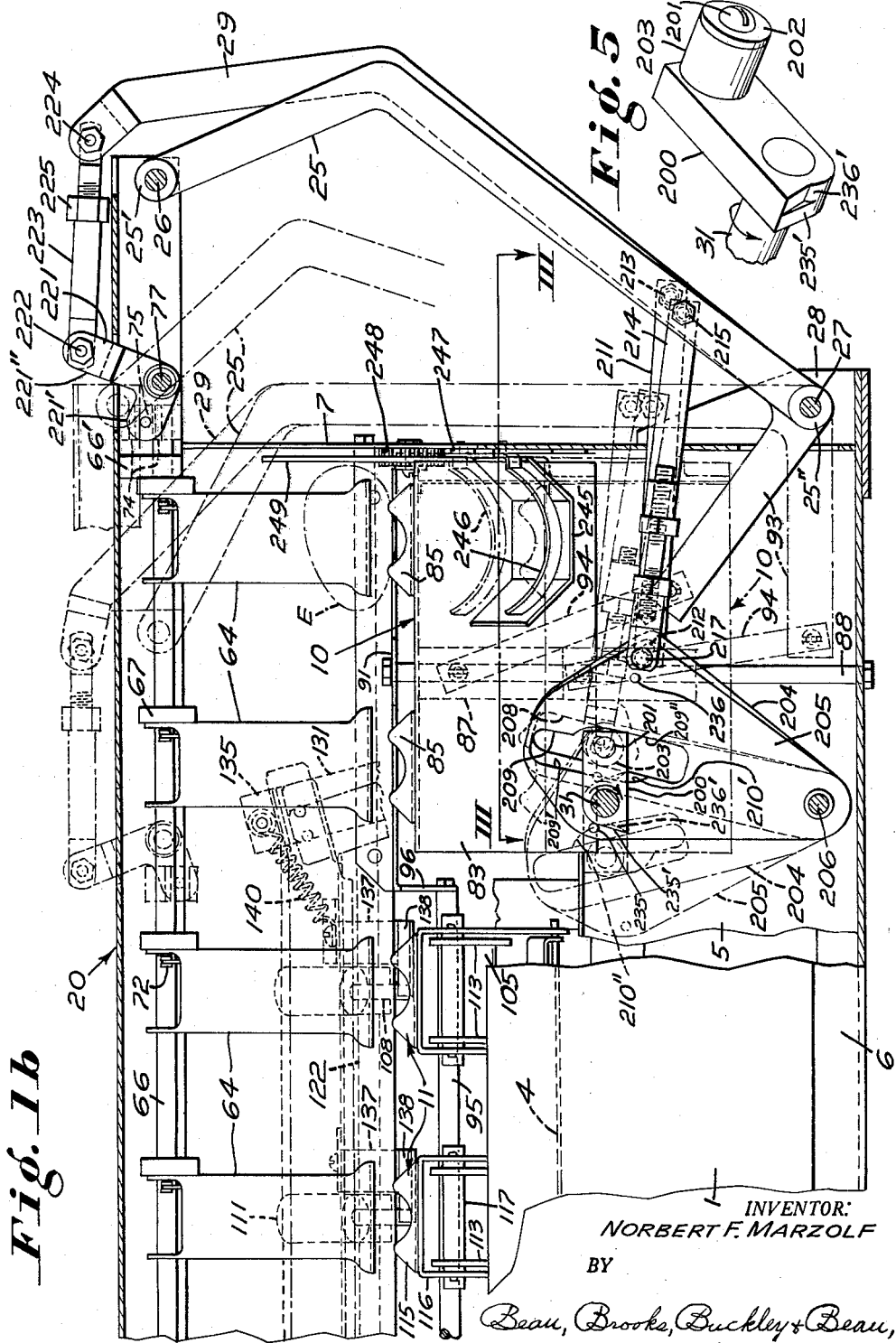

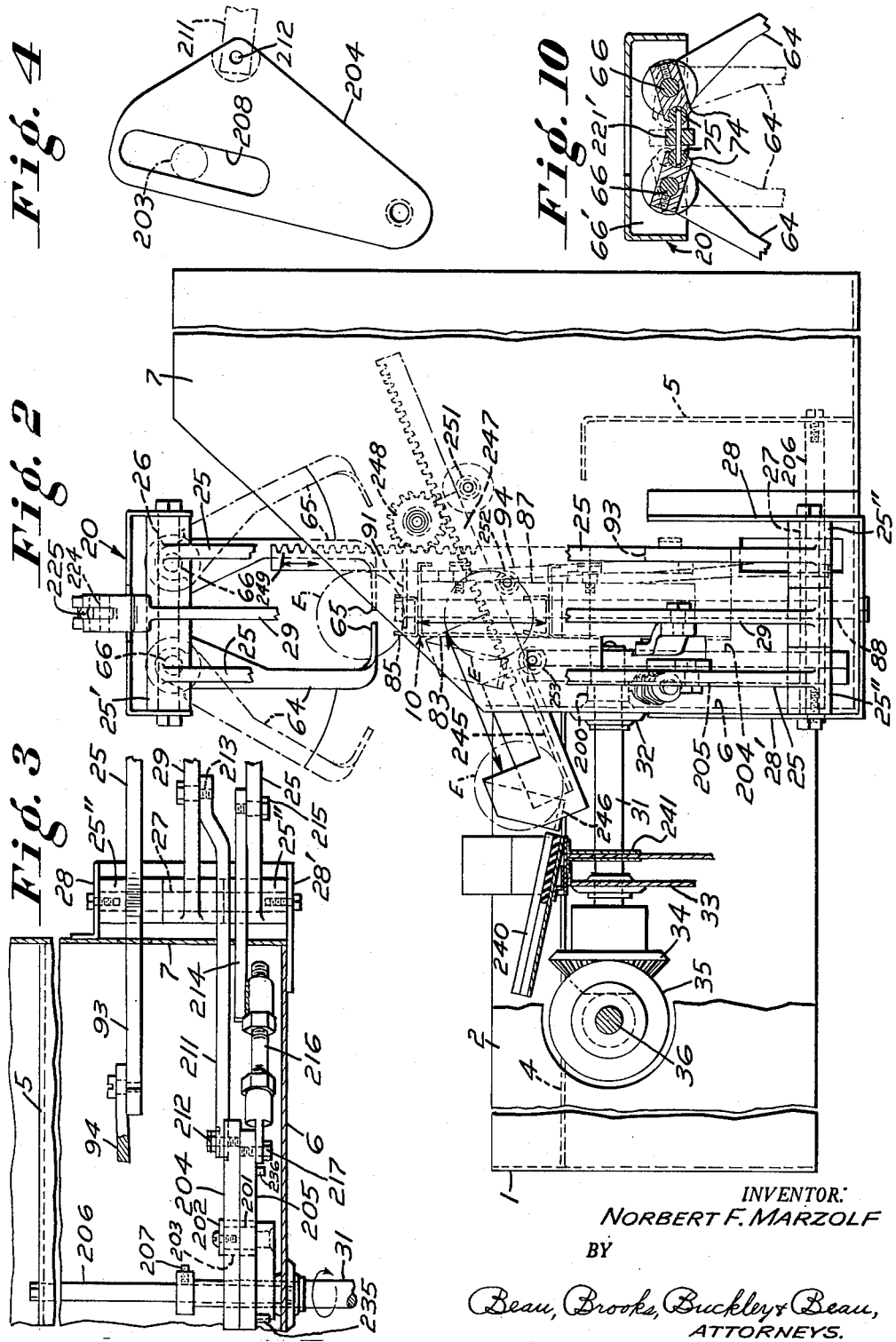

United States Patent Office 3,002,619
Patented Oct. 3, 1961

3,002,619
EGG GRADER
Norbert F. Marzolf, Strykersville, N.Y., assignor, by mesne assignments, to Marzolf Manufacturing Co., Inc., Strykersville, N.Y., a corporation of New York
Filed Dec. 20, 1955, Ser. No. 554,202
3 Claims. (Cl. 209—121)

This invention relates generally to the art of grading articles by weight, and more specifically to a new and useful egg grading machine.

In my pending application for United States Letters Patent Ser. No. 391,509, now Patent No. 2,835,386, I disclose a novel egg grading machine having multiple balances responsive to different weights and arranged with their egg receiving platforms aligned, means for delivering eggs to a point adjacent one end of the aligned platforms, transfer means for transferring eggs from the delivery means to the adjacent balance, or pair of balances, and then to succeeding balances including carriage means mounted for reciprocating movement over said platforms and said delivery means with a predetermined stroke to transfer eggs from the delivery means to the engagement balance or pair of balances, and then to succeeding balances, egg engaging means carried by the carriage means for movement into and out of egg engaging position, and drive means including means for reciprocating the carriage through its predetermined stroke and means for moving the egg engaging means alternately into and out of egg engaging position upon the carriage reaching the end of its stroke in opposite directions.

The machine of this invention is of the same general type, with its manifold advantages. However, whereas in my earlier application the drive means utilizes a reciprocating drive member and coupling means locking the drive member to the carriage for movement therewith throughout the carriage stroke and then automatically unlocking it from the carriage for movement relative thereto to alternately open and close the egg engaging means at the opposite ends of the carriage stroke, it has been found that while this drive and actuating arrangement is highly satisfactory in many respects, it is relatively difficult to set up the various connections and couplings used therein and to keep them in proper operating adjustment.

Accordingly, it is a primary object of this invention to provide an egg grading machine of the above general type having the desirable characteristics thereof, but with drive and actuating means which are relatively simple to set up and keep in proper operating adjustment, so that even those who are not mechanically inclined will encounter relatively little difficulty in that respect.

Another object of this invention is to provide a new egg feeding arrangement to the machine which better controls movement of the egg to the delivery point.

The foregoing and other objects and advantages of an egg grading machine in accord with this invention will become clearly apparent from the ensuing detailed description of a presently preferred embodiment thereof, taken together with the accompanying drawing showing such embodiment and forming a part of this specification wherein:

FIGS. 1a and 1b show the opposite ends of an egg grading machine in accord with my invention, and taken together comprise a front elevational view thereof with certain parts being broken away for greater clarity;

FIG. 2 is an end elevational view thereof;

FIG. 3 is a fragmentary plan view of the drive mechanism of my invention being taken about on line III—III of FIG. 1;

FIG. 4 is a front elevational view of one of the rocker plates in the drive mechanism of this invention;

FIG. 5 is a perspective view of the crank arm forming part of the drive mechanism;

FIGS. 6, 7, 8 and 9 are schematic views illustrating the operation of the drive means of this invention; and FIG. 10 is a detail sectional view of the article engaging actuating means.

Referring now to the accompanying drawings, except as indicated above and hereinafter the egg grading machine of this invention is generally identical with that disclosed in my earlier application, and therefore the parts hereof corresponding to those of my earlier machine are illustrated and described herein only as and to the extent required to clearly illustrate the specific improvements of this invention and the relation thereof to the entire machine, and such parts are identified by the same reference numerals herein as in my earlier application.

Thus, the machine of this invention, as in my earlier application, preferably comprises a front portion having a front wall 1 and side walls 2 and 3 adapted to support an egg receiving tray 4 detachably secured across the upper surface thereof. The rear portion of the machine is defined in part by side wall 3, and has a rear wall 5, a front wall 6, and a side wall 7, and side wall 2 of the front portion abuts wall 6 at a point spaced inwardly from side wall 7 to provide an area for egg feeding trackways as will be described. The various wall parts are secured together by suitable frame and angle members in a known manner whereby to provide a solid construction, with various of the wall plates being detachably secured if desired.

A loading elevator, generally designated 10, is provided at one end of the machine adjacent the egg feeding trackway area, and a series of balances, or pairs of balances, are positioned in side by side relation with their article receiving platforms in alignment with those of the loading elevator, the first pair of balances being generally designated 11 and the last balance of the last pair of balances being generally designated 14.

Eggs are fed into the machine along the feed trackways, and elevator 10 is adapted to receive the eggs and raise them to the level of the balance platforms, as will be described more fully hereinafter. Also, tray 4 will be divided into different areas, for receiving the different grades of eggs as described in my earlier application.

The transfer mechanism of this invention is generally the same as in my earlier case, apart from the drive mechanism, and is adapted to transfer eggs from the platforms of elevator 10 to the first pair 11 of balances, and then to succeeding pairs of balances, until the eggs either depress the balances to roll onto the tray 4 or are deposited in the last area which is reserved for those eggs which are too light to actuate any of the balances and which are classed as "pullet" eggs.

Thus, the transfer mechanism comprises a carriage 20 of inverted channel shape mounted over the balance platforms 115 and the elevator 10, and is supported at one end by a rocker arm 21 having a transverse journal portion 21' rotatable on a shaft 22 extending between the opposite side walls of the carriage 20, which rocker arm is pivoted at its lower end on a shaft 23 extending between the walls 5 and 6 of the machine frame. At its opposite end, carriage 20 is supported by a pair of rocker arms 25 having journal portions 25' receiving a shaft 26 extending between the carriage side walls. Arms 25 are pivoted at their lower ends by means of journal portions 25'' rotatable on a shaft 27 carried between brackets 28 and 28' secured to walls 7 and 6, respectively. Arms 21 and 25 are formed and arranged to cause carriage 20 to rock through a slightly convex arc over the elevator and balance platforms.

The carriage 20 carries article engaging members comprising pickers 64 which are of generally channel form arranged in pairs and having their channels facing each other. The pickers are provided at their lower ends with inwardly extending fingers 65, and are carried at their upper ends by parallel rods 66 journaled for rotation in suitable brackets 66' carried by the carriage 20 so as to extend lengthwise of the carriage. Washers 67 are secured to rods 66 for movement therewith adjacent each picker 64 and carry a projection engaging against a shoulder on the associated picker 64 to positively open each pair of opposed pickers with corresponding movement of rods 66, the opposed pickers being resiliently closed upon rotation of rods 66 in the opposite direction by springs 72 extending between the pickers and the projections. At one end thereof, rods 66 carry inwardly extending cylindrical socket members 74 fixed thereto, as by set screws, which socket members receive therein cylindrical bearings 75 carried at one end of and extending outwardly from opposite sides of a link 221 pivoted on a shaft 77 extending between the carriage side walls.

The various balances are identical in construction, although the different pairs thereof will be adjusted to be responsive to different weights. Thus, as described in my earlier application, each balance includes a beam having as part thereof a plate 105 pivoted on supports fixed to the wall 5, a rod 108 extends rearwardly therefrom and carries an adjustable weight member 111. The balance platform comprises an egg supporting member 115 carried by an inverted U-shaped bracket 116 which is pivoted on upstanding ears 113, on the forward end of plate 105, by a fulcrum bar 117. The platform 115 remains level as it descends under the weight of an egg, and it passes beneath a rod 95, secured at one end to a bracket 96, to displace the egg therefrom onto the tray 4.

Also, means are provided to lock the balances in their position of rest as the eggs are deposited thereon, such means including a flanged plate 130 pivotally connected adjacent its opposite ends to forked rocker arms 131 and 132 in turn pivotally connected to wall 5 adjacent their lower ends. The opposite ends of plate 130 extend at a slight inclination in substantially parallel directions and engage beneath guides 135. Locking members 137 are secured to the flange of plate 130 and depend therefrom adjacent each balance beam rod 108, being provided with inclined flange portions 138 adapted, when plate 130 is moved to the broken line position of FIGS. 1a and 1b to engage rods 108 and hold the weights 111 thereon against the supporting rod 122. A spring 140 extends between one of guide plates 135 and the adjacent locking member 137 to normally hold plate 130 and the locking member 137 out of engagement with the balance beam rods 108.

In my earlier machine the carriage 20 is driven, and the egg engaging pickers 64 are actuated, by drive means including arm 29, and coupling means are provided for locking the carriage to the arm 29 throughout the carriage stroke and then, at the end of the carriage stroke in each direction, automatically unlocking them to permit the arm 29 to continue movement in the same direction to alternately open and close the egg engaging pickers. However, experience has shown that this mechanism requires several critical mechanical adjustments which are fairly critical, and it is desired to provide a simpler drive and actuating mechanism which does not require any particular degree of mechanical skill to set it up and to maintain it in operating condition.

In accord with this invention, the foregoing is accomplished by a drive and actuating mechanism including a rotating crank arm engaging a pair of cam-slotted rocker plates, one connected to the carriage through a rocker arm 25, and the other connected to the egg engaging pickers through arm 29, the two rocker plates moving in unison throughout the carriage stroke and the one rocker plate and the carriage dwelling at the end of each carriage stroke while the other rocker plate completes its stroke alternately opening and closing the pickers.

Thus, a presently preferred embodiment of a drive arrangement in accord with this invention is as follows. A shaft 31 is journaled adjacent its opposite ends in bearings 32 carried by wall 6 and by a bracket 33 secured to wall 2. At its outer end, shaft 31 carries a bevel gear 34 meshing with a second bevel gear 35 carried at the end of a drive shaft 36 extending from a suitable drive, not illustrated, which can be for example the drive of my egg cleaning machine as described in my pending application for United States Letters Patent Ser. No. 264,541, now Patent No. 2,824,318. At its inner end, shaft 31 carries a crank arm 200 connected to reciprocate the carriage 20 and to open and close the pickers, as follows.

The crank arm 200 carries, as by the bolt 201 and retaining washer 202, a roller 203 connected to drive the carriage 20 and to open and close the pickers 64 through drive linkage including the cam slotted rocker plates 204 and 205 which are pivoted on the machine frame by a shaft 206 and are held thereon as by a set screw 207. The rocker plates 204 and 205 have cam slots 208 and 209 therein extending generally radially thereof, the former being of generally rectilinear form and the latter having laterally offset opposite end portions 209' and 209" each adapted for movement into alignment with slot 208.

The rocker plate 204 is connected to the arm 29 by a link 211 pivotally connected at one end to the rocker plate 204, as at 212, and at its opposite end to the arm 29, as at 213. The arm 29 is connected to the cylindrical bearings 75, for alternately opening and closing the pickers 64, by a link 221, of generally right angle form having a short leg 221' carrying the cylindrical bearings 75 and a long leg 221" pivotally connected at 222 to a length-adjustable link 223 pivotally connected at its other end to the upper end of the arm 29, as at 224, a nut 225 being provided to hold the link 223 in its adjusted length. The rocker plate 205 is connected to an arm 25, for reciprocating carriage 20, by linkage including a link 214 pivoted at one end to an arm 25, as at 215, and secured at its opposite end to a length-adjustable link 216 having its opposite end pivotally connected to the rocker plate 205, as at 217.

The operation of this drive mechanism is as follows. The crank arm roller 203 extends into and through the rocker plate cam slots 208 and 209, and as the crank arm 200 is rotated the roller 203 travels along the slots between their ends and bears against the sides thereof to rock the plates about their pivot axis.

Assume now that the parts are in the position shown in full lines in FIGS. 1b and 6, wherein the pickers 64 have just closed to engage the eggs carried on the platforms 115 of the balances 11 and the platforms 85 of the elevator 10. At this point, the slot 208 of plate 204 is aligned with the inner offset end portion 209" of slot 209 and the roller 203 has reached its extreme right hand position as viewed in these figures. The roller then moves downwardly and bears against the side wall surfaces of cam slots 208 and 209" to swing the rocker plates 204 and 205, and consequently arms 25 and 29, simultaneously to the left in the direction of the arrow in FIG. 7 which shows the parts mid-way through the egg transfer carriage stroke. As the carriage reaches the end of its stroke in the direction of the arrow in FIG. 7, this being its egg transfer stroke, and just before the point depicted in FIG. 8, the parts are in the position shown in broken lines in FIGS. 1a and 1b and roller 203 passes onto the curved side wall part 210' of slot 209 leading to the offset portion 209' thereof. The curved side wall parts 210' and 210" leading to the offset end portions 209' and 209", respectively, of cam slot 209, are on the same radius as the arc through which the roller 203 moves, so that when the roller moves along these portions of the cam slot 209 the rocker plate 205 will not move but will dwell, thereby providing a lost motion connection between rocker plate 205 and roller 203. However, during this time the roller 203 continues to bear against the side wall of cam slot 208 and urges rocker plate 204 about its pivot 206 to align slot 208 with the slot portion 209' thereby continuing the stroke of arm 29 beyond that of arm 25 and carriage 20. During this continuing stroke of arm 29, while arm 25 and carriage 20 dwell, link 221 is pivoted to open the article engaging pickers, and the position assumed by the parts at this point is shown in FIG. 8.

At this point the crank arm is in its extreme left position in FIG. 1b, and the slot 208 and the offset portion 209' are aligned, whereby the two rocker plates 204 and 205 swing in unison to the right in FIG. 1b causing the arms 25 and 29 to move together for moving the carriage 20 through its return stroke in the direction of the arrow in FIG. 9, which shows the relative position of the parts mid-way of the carriage return movement, with the pickers 64 held in open position.

At the end of the carriage return stroke, the roller moves along the curved part 210" leading into offset portion 209", during which time the rocker plate 205 again dwells, to hold the carriage 20 at that position, and the movement of rocker plate 204 is continued causing arm 29, now moving relative to carriage 20, to close the pickers 64, whereupon the parts assume the position shown in full lines in FIG. 1b and in FIG. 6. This action is then repeated as long as the machine is running.

The weight of carriage 20 normally would tend to defeat the action of the drive mechanism, because each time it passed its dead center position it would take the rocker plates away from roller 203. To avoid backlash, and to at all times urge the rocker plates 204 and 205 against the roller 203 to maintain them in proper contact for the desired action described above, the carriage is resiliently urged toward its dead center position. To this end rocker arm 21 is provided with a plate 227 adjustably secured thereto as by a bracket 228 and having upwardly inclined opposite end portions 229 forming on their bottom surfaces seats bearing against coil springs 231. The springs 231 are secured to the machine frame as by the plates 232 secured thereto by the nuts and bolts 233.

Springs 231 are selected to be strong enough to overcome the weight of carriage 20 and to support it in its dead center position, whereby the carriage is not only at all times so supported that the rocker plates are held against the drive roller 203 to insure proper driving action thereof, but in addition wear on the driving parts is greatly reduced and a much smoother drive action is provided.

Another feature of this drive mechanism which is considered to be of significance is that the crank arm roller 203 moves through a greater arc on the carriage return stroke than it does on the carriage transfer stroke, and therefore even the crank arm 200 is rotating at a constant speed the carriage 20 will have a slightly slower return stroke, in the direction of the arrow of FIG. 9, providing more time to weigh the eggs which have just been deposited on the balance platforms. This allows more time for the balance platform to be lowered under the weight of an egg thereon and is of considerable importance when the egg is of a weight placing it right on the border line between adjacent grades so that slightly more time is required for it to actuate the balance.

It will be appreciated that the foregoing drive mechanism is quite simple to set up and to keep in adjustment, the picker action being readily controlled by the length-adjustable link 223, and the carriage drive arm action being readily controlled by the length-adjustable link 216.

Link 216 has both relatively coarsely and relatively finely threaded portions, both of the same hand, giving a differential length adjusting action. This provides a significant advantage, as compared for example to turnbuckles having right and left hand threaded portions, because it facilitates sensitive adjustment.

To further insure proper operation of this drive mechanism, take-up pins 235 and 236 are provided on the rocker plate 205, the former pin being of a greater length than the latter. These pins are positioned on opposite sides of the rocker plate cam slot 209 at points along the path of the inner end of the crank arm 200, and said crank arm is formed to provide two adjacent cam surfaces 235' and 236'. Thus, looking now for example at FIG. 1, with the parts in the full line position thereof the cam surface 235' engages the pin 235 to cause the roller 203 to bear against the side wall surface of slot 209" remote from pin 235. Similarly with the parts in the position thereof shown in broken lines in FIG. 1b, the surface 236' will bear against the pin 236, to insure proper engagement of roller 230 against the side wall surface of slot 209' remote from pin 236. As a result, if the springs 231 should for some reason fail, the take-up pins 235 and 236 will insure proper engagement between the rocker plate 205 and the crank roller 203 for proper operation. Either the springs or the take-up pins could be used separately, but it is felt that the entire operation is smoother when they are used together and the take-up pins then provide protection against failure of the drive mechanism.

Also, as in my earlier application adjustable end stops 152, carried by a bracket 150, provide positive stops defining the opposite ends of the carriage stroke, to limit the movement thereof in opposite directions. In addition, it will be noted that the rocker arm 21 is provided with a pin 141 projecting therefrom to engage a bracket 142 on the part 132 to lock the balances as the eggs are deposited thereon, in the manner described in my earlier application.

Thus, this invention provides a much simpler drive mechanism requiring only simple adjustments and possessing the further advantage that it allows a little more time for weighing the eggs with no increase in the total elapsed time.

I also provide a new mechanism for feeding eggs to the elevator 10. Whereas in my earlier application the eggs are fed to the elevator by gravity, rolling onto the elevator platforms when the elevator is lowered, I now provide on at least one egg feeding track, such as that receiving eggs from the egg washing machine of my earlier application, a positive feed action. Thus, while the elevator itself is constructed generally along the lines of my earlier application, comprising a bracket 83 mounting egg supporting platforms 85 on the top thereof, and carrying a sleeve 87 surrounding a vertical guide post 88 fitted in bearings carried by the sleeve, the guide post being connected at its upper end to a bracket 91 fastened to the machine, and at its lower end to the machine frame.

Elevator 10 is connected to an arm 25 having a generally right angularly related inner end part 93 by a link 94 pivotally connected thereto and to the elevator, whereby the elevator is raised and lowered along the guide post 88 as the arm 25 and carriage 20 are reciprocated, being synchronized therewith to present the elevator platforms 85 at their upper position, level with balance platforms 115, for the eggs thereon to be picked up by the article engaging pickers 64, as the carriage completes its return stroke and is at the position thereof shown in full lines in FIG. 1b.

The eggs are fed, by gravity, along a downwardly inclined feed track 240 of generally channel shape and preferably having a U-shaped lining of rubber or similar material along which the eggs roll. Track 240 is secured to the machine, as by a bracket 241, and at its inner end track 240 leads to an upwardly inclined track 245 of generally channel shape along which an arcuate scoop 246 of concave form is reciprocated.

Scoop 246 is moved by a rack 247, being formed integrally therewith, which engages a pinion 248 which in turn meshes with a second rack 249 fixed to the elevator 10 for movement therewith, whereby movement of scoop 246 is synchronized with that of elevator 10. Rack 247 rides on bearing surfaces 251, 252 and 253, being held in place thereon against the side wall of the machine as by washers.

Thus, when the parts are in their full line position in FIG. 1b, where the pickers 64 have just closed around the eggs on the elevator 10, the scoop 246 is at the lower end of the track 245 receiving an egg rolling thereover onto track 245 from the track 240, and as the arm 25 and carriage 20 swing to the left in the direction of the arrow in FIG. 7 elevator 10 is lowered and causes the scoop 246 to move the egg up along track 245, the parts being synchronized so that the egg reaches the top of track 245 and is deposited on the elevator platform 85 when the latter is in its lowest position, the parts assuming the position thereof shown in broken lines in FIG. 1b. Of course, means, not illustrated, can be provided to feed eggs one at a time from track 240 to track 245.

Thus, a positive feed is provided, and it will be appreciated that a second feed track, for the platform 85 on the left side of the elevator 10 in FIG. 1b, will be provided which can use a gravity feed if it is intended to receive eggs manually placed thereon, as distinguished from track 240 intended to receive eggs from my egg washing machine, and which can be aligned as they are placed on the track. Of course, the second feed track could duplicate the arrangement shown at 245 and 246. Scoop 246 not only positively feeds the eggs to the elevator, but it also, because of its concave form, aligns the eggs crosswise of the track 245 to be received in proper alignment on the elevator platform 85 as each egg is moved upwardly thereby along track 245.

Accordingly, it is seen that the egg grader of this invention fully accomplishes the aforesaid objects. While only a presently preferred embodiment of my invention is shown herein, it will be appreciated that the same is not necessarily limited to the details thereof but is susceptible of modification and variation without departing from the spirit of the invention and the scope of the appended claims.

While the preferred embodiment disclosed herein, as in my earlier application, provides pairs of balances and a pair of elevator platforms, to grade two runs of eggs simultaneously, the invention can be used with machines for grading only one run at a time, or more than two runs simultaneously. Also, while my invention is disclosed herein in a form for grading eggs by weight, it can be used in machines for grading other articles.

Having fully disclosed and completely described my invention, together with its mode of operation, what I claim as new is:

1. In a mechanism for grading articles by weight, a series of balances having article receiving platforms arranged in alignment with each other, article delivery means arranged adjacent one end of said series of platforms, and article transfer means for transferring articles from said delivery means to the adjacent and then to succeeding balance platforms including carriage means mounted on said mechanism for movement through an arcuate path with a predetermined stroke back and forth over said platforms and said delivery means, article engaging means carried by said carriage means for movement relative thereto into and out of article engaging position, means including drive means movable with said carriage means through said predetermined stroke in each direction and then relative thereto at the end of said predetermined stroke in each direction for moving said article engaging means alternately into and out of article engaging position, and spring means biasing said carriage means to its dead center position intermediate the opposite ends of said predetermined stroke.

2. In a mechanism for grading articles by weight, a series of balances having article receiving platforms arranged in alignment with each other, article delivery means arranged adjacent one end of said series of platforms, and article transfer means for transferring articles from said delivey means to the adjacent and then to succeeding balance platforms including carriage means, rocker arms mounting said carriage means on said mechanism for arcuate movement with a predetermined stroke back and forth over said platforms and said delivery means, article engaging means carried by said carriage means and movable relative thereto into and out of article engaging position, means including drive means movable with said carriage means through said predetermined stroke in each direction and then relative thereto at the end of said predetermined stroke in each direction for moving said article engaging means alternately into and out of article engaging position, a pair of coil springs each adapted to support said carriage means against movement past its dead center position, and a bearing member carried by one of said rocker arms for bearing against said springs.

3. In a mechanism for grading eggs by weight, a balance having an egg receiving platform, egg delivery means arranged adjacent said platform, and egg transfer means for transferring eggs from said delivery means to said platform comprising, carriage means mounted on said mechanism for movement with a predetermined stroke back and forth over said platform and said delivery means, egg engaging means carried by said carriage means and movable relative thereto into and out of egg engaging position, drive means movable with said carriage means through said predetermined stroke in each direction and relative thereto at the end of said predetermined stroke in each direction, and means actuated by said drive means during such relative movement thereof for alternately moving said egg engaging means into and out of egg engaging position, said egg delivery means comprising elevator means mounted for up and down movement and connected to said drive means for movement thereby in synchronism with said carriage means, upwardly inclined feed track means terminating at the upper end thereof adjacent said elevator means at a position for delivering eggs thereto when the latter is in a lowered position, scoop means of concave form adapted to cradle an egg in transverse alignment with said track means, and rack and pinion means connecting said scoop means to said elevator means for reciprocating movement thereby in synchronism therewith along said track means.

References Cited in the file of this patent

UNITED STATES PATENTS

| | | |
|---|---|---|
| 1,959,237 | Hiscock | May 15, 1934 |
| 2,005,522 | Holm | June 18, 1935 |
| 2,197,018 | Demmler | Apr. 16, 1940 |
| 2,500,579 | Seglund | Mar. 14, 1950 |
| 2,687,802 | Davis | Aug. 31, 1954 |
| 2,783,883 | Davis | Mar. 5, 1957 |
| 2,835,386 | Marzolf | May 20, 1958 |

FOREIGN PATENTS

| | | |
|---|---|---|
| 18,319 | Great Britain | Jan. 4, 1906 |